Patented Nov. 25, 1952

2,619,512

UNITED STATES PATENT OFFICE 2,619,512

OLEFIN POLYMERIZATION

William Keddie Meerbott, Houston, Tex., assignor to Shell Development Company, San Francisco, Calif., a corporation of Delaware No Drawing. Application January 11, 1949, Serial No. 70,375

11 Claims. (Cl. 260—683.15)

This invention relates to the catalytic conversion of normally gaseous olefins to normally liquid products and relates more particularly to the polymerization of normally gaseous olefinic hydrocarbons with the aid of phosphoric acid catalysts.

Processes have been disclosed heretofore resorting to the use of phosphoric acid, as such or in modified form, to catalyze the olefin polymerization reaction. The use of the acid as such, however, has proven highly impractical, not only because of inability to achieve a proper degree of intimacy of contact between reactants and catalyst and its relatively low activity for certain types of reactions, but because of the exceedingly high corrosion rate suffered by most materials of construction upon contact therewith. Catalysts have been developed which have overcome these difficulties thereby enabling their use on a practical scale operation with varying degrees of success. Such catalysts are generally obtained by absorbing phosphoric acid in a finely divided adsorptive material. Such mixtures are converted to a form more suitable for handling and use in the process by such steps as calcining and shaping. Though such catalysts possess a relatively high activity and avoid the presence of substantial amounts of acid in the liquid state in the reaction zone, they nevertheless possess distinct disadvantages often limiting the conditions under which they can be employed and detracting materially from economical operation under certain conditions. An outstanding disadvantage of such solid type phosphoric acid catalysts as disclosed heretofore is the difficulty occasioned in their use on a practical scale; difficulties which are directly attributable to their relatively low mechanical strength. These difficulties often offset to a substantial degree any advantages these catalysts may possess with respect to catalytic activity over otherwise less desirable catalysts.

As a result of such lack of mechanical strength these catalysts will often undergo substantial deterioration of physical structure as a result of the handling which they must of necessity undergo in practical scale operation. The use of the catalyst in the form of stationary beds without recourse to intermediate support will add to the degree of such structural deterioration. Severe operating conditions, such as the use of high pressures often requisite to the attainment of a particular product, will contribute materially to deformation and crumbling of the catalyst. A further particular disadvantage of such solid-type phosphoric acid catalysts disclosed heretofore is their inability to withstand contact with any substantial amount of liquid or water vapor without relatively rapid disintegration of structure. As result of the operational difficulties ensuing directly from such lack of mechanical strength, the duration of an operation employing these catalysts is often determined not by loss of catalyst activity but by excessive pressure drop and channelling through the catalyst bed resulting from clogging and obstruction occasioned by substantial disintegration of the physical structure of the catalyst.

It is an object of the present invention to provide an improved process enabling the more efficient conversion of normally gaseous olefinic hydrocarbons to normally liquid products. Another object of the invention is the provision of an improved process for the more efficient conversion of normally gaseous olefins to normally liquid products with the aid of solid-type phosphoric acid catalysts of improved durability and capable of reactivation by the direct addition of liquid phosphoric acid thereto, in situ.

A more particular object of the invention is the provision of an improved process for the more efficient conversion of normally gaseous hydrocarbons comprising propylene to normally liquid products. Other objects and advantages of the invention will become apparent from the following detailed description thereof.

In accordance with the process of the invention normally gaseous hydrocarbons comprising olefins are converted to normally liquid hydrocarbons by contacting the hydrocarbons comprising the olefins at olefin polymerizing conditions with a bed of catalyst consisting essentially of porous calcined, phosphoric acid impregnated, ceramically bonded aggregate and intermittently or continuously introducing liquid phosphoric acid into the catalyst bed.

The catalysts employed in the process of the invention are disclosed and claimed in co-pending application Serial No. 72,547, filed January 24, 1949.

The ceramically bonded porous aggregates employed in the production of the solid-type phosphoric acid catalysts of superior durability and stability employed in the process of the present invention are obtained by ceramically bonding a suitable inert, refractory, acid resistant solid carrier material with a ceramic bonding agent. Suitable acid resistant, inert, highly refractive carrier materials comprise, for example, elementary silicon in either the crystalline or amorphous form; the inert and heat stable compounds of silicon or aluminum such as silicon carbide, the oxides of silicon and aluminum; magnesium oxide, crushed firebrick, marble, glass, majolica, bauxite, and the like. Suitable bonding agents comprise the known bonding agents of the ceramics industry such as, for example, hydrated alumina, aluminum silicate, aluminous bonding clays such as slate clay, plastic clay, kaolin, ball clay, potter's clay and the like. The inert carrier materials are bonded together with a sufficient amount of clay at bonding temperature to result in a ceramically bonded porous aggregate. The particular temperature employed in effecting the bonding is dependent upon the particular materials employed. In general temperatures in excess of about 800° C. and up to about 2000° C. may be employed. It is to be understood, however, that the invention is in no wise limited by the particular conditions employed in effecting the production of the ceramically bonded aggregate. Although any solid, inert, heat and acid resistant carrier material may be employed as a starting material, the preferred catalysts are obtained by ceramically bonding elementary silicon or a highly refractory compound thereof such as the oxide and/or carbide of silicon. Particularly preferred ceramically bonded porous aggregates comprise those having from about 60 to about 95%, and preferably above 70% by weight of elementary silicon and/or oxide or carbide of silicon. Highly suitable porous aggregates are obtained by fusing a bonding material having a high alumina content with the silicon and/or oxide or carbide of silicon, in such proportions that the ceramically bonded porous aggregates will contain from about 5% to about 40%, and preferably from about 5% to about 30% by weight of alumina. Particularly preferred ceramically bonded aggregates comprise those having a silicon content of about 90% and an alumina content of about 10% by weight.

The catalysts comprising ceramically bonded aggregates consisting essentially of silicon and/or silicon carbide are particularly advantageous not only because of their durability, uniformity and stability, but because they possess a thermal conductivity superior to such materials as Alundum, flushed kieselguhr, and the like, thereby greatly facilitating the maintenance of a uniform temperature throughout the catalyst bed generally essential to efficient and economical operation of a catalytic process.

The ceramically bonded aggregates may contain minor amounts of other materials such as, for example, one or more compounds selective from the oxides of the metals of the first transition series of the elements of the periodic table and the oxides of the alkali and alkaline earth metals. Particularly suitable addition agents comprise, for example, ferric oxide, magnesium oxide, vanadium oxide, titanium oxide, ferrous oxide, zinc oxide, sodium oxide and calcium oxide. Such addition agents may be present in the ceramically bonded aggregate in an amount ranging for example from about 1 to about 10%, and preferably from about 3 to about 8% by weight of the aggregate. Not only is the presence of such additional agents highly desirable in the finished catalysts but their presence in the materials prior to bonding facilitates the bonding operation and contributes materially to the strength of the bonded aggregate. A particularly desirable ceramically bonded porous aggregate comprises a ceramically bonded mixture of silica and alumina containing about 85% to 90% silica, 5% to 9% alumina, and from 1% to 10% by weight of one or more of said addition agents.

Illustrative of one method of producing a ceramically bonded, porous aggregate, suitable for use as a starting material in the preparation of the catalysts employed in the polymerization process of the invention, is the following:

A porous, ceramically bonded aggregate, consisting essentially of silica and alumina, is prepared by mixing six parts of diatomaceous earth with one part by weight of a high alumina (montmorillonite) bonding clay containing:

| | Per cent |
|---|---|
| $SiO_2$ | 20.27 |
| $Al_2O_3$ | 47.28 |
| $Fe_2O_3$ | 8.68 |
| $CaO$ | 2.75 |
| $Na_2O$ | 0.97 |
| $H_2O$ | 19.72 |
| Misc. | 0.43 |

The diatomaceous earth and clay are mixed and the mixture ground to a uniform, finely divided state. Water is added to the mixture in sufficient amount to form a thick paste which is shaped into pellets by extrusion. The resulting pellets are dried by slowly heating to a maximum temperature of about 150° C. When evolution of steam has ceased the temperature is raised to about 600° C. and maintained at about this temperature for a period of about 30 minutes after which the material is subjected to a bonding temperature of about 1150° C. for a period of one hour. The resulting calcined material is cooled slowly to yield a porous, ceramically bonded aggregate consisting essentially of alumina and silica suitable for use as starting material in the production of the catalysts of the present invention.

Catalyst of unusually high mechanical strength, and capable of withstanding contact with substantial amounts of liquid without deterioration of their structure or loss of activity are obtained by impregnation of the porous ceramically bonded aggregate with ortho phosphoric acid, pyro phosphoric acid or tetra phosphoric acid. The impregnation of the ceramically bonded aggregates is carried out by any suitable means such as, for example, the soaking of the aggregate in the acid for a period of time sufficient to effect penetration of the acid into the porous structure of the aggregate followed by calcining at elevated temperatures. In a preferred method of combining the phosphoric acid with the aggregate the aggregate is refluxed in the acid prior to the calcining operation.

Although the catalysts thus obtained by simple impregnation of the porous ceramically bonded aggregate with a phosphoric acid, such as ortho phosphoric acid, are eminently suitable for the execution of a wide variety of organic reactions such as olefin hydration, alkylation, etc. they are generally not sufficiently active to attain the high level of conversions commensurate with practical scale olefin polymerization. Catalysts combining the highly advantageous properties of durability with high activity for olefin polymerization are obtained by impregnating the ceramically bonded porous aggregates with phosphoric acid in a manner resulting in a catalyst having a phosphorus pentoxide content of from about 35% to about 70%, and preferably above about 50% by weight. The catalysts of high phosphorus pentoxide content may be obtained by repeating one or more times the impregnation and calcining steps. Whereas a single impregnation of such materials generally fails to result in a satisfactory catalyst for the promotion of the olefin polymerization reaction the repetition of the operation results in catalysts of high activity. In a preferred method of preparing the catalysts of the invention particularly suitable for the olefin polymerization reaction, the porous ceramically bonded aggregate is combined with phosphorus pentoxide, or mixtures of phosphorus pentoxide and phosphoric acid, in a manner permitting the impregnation and/or sublimation of the phosphorus pentoxide into the porous structure. This is achieved, for example, by such steps as refluxing the porous ceramically bonded aggregate in a mixture of phosphoric acid and phosphorus pentoxide or heating a mixture of the aggregate and phosphorus pentoxide in a phosphorus pentoxide atmosphere, prior to calcination. Further additions of phosphorus pentoxide are preferably made to the mixture during the refluxing operation. Catalysts having a high phosphorus pentoxide content are also obtained by preparing a paste or slurry of phosphorus pentoxide in phosphoric acid, combining the ceramically bonded aggregate therewith, allowing the mixture to stand at room temperature or at an elevated temperature for a period of time and thereafter calcining it. After calcination the catalyst is broken into particles of suitable size. The resulting particles are used as such or may be subjected to conventional forming or shaping operations.

The process of the invention is applicable broadly to the polymerization of the polymerizable unsaturated hydrocarbons such as, for example, the olefinic hydrocarbons as exemplified by propylene, butylenes, pentenes, hexenes, heptenes, octenes and their higher homologues, to liquid polymers thereof. The process of the invention is applied with particular advantage to the conversion of the normally gaseous olefins, such as propylene, to normally liquid hydrocarbons. The olefinic hydrocarbons may be charged to the reaction zone containing the solid type catalysts, as such or in admixture with other hydrocarbons capable or not of undergoing conversion under olefin polymerizing conditions of the process. Thus the olefinic hydrocarbon charge to the process may comprise, in addition to olefins, one or more saturated hydrocarbons. Suitable olefinic charge to the process comprises hydrocarbon mixtures of fractions comprising substantial amounts of olefinic hydrocarbons. Gaseous materials such as, for example, hydrogen, nitrogen, and the like, may also be introduced into the reaction zone.

The olefin polymerization is carried out in the presence of the solid phosphoric acid catalysts at a temperature in the range, for example, from about 190° C. to about 275° C., and preferably from a temperature of from about 235° C. to about 270° C. Pressures ranging from about atmospheric pressure to superatmospheric pressures in the order of about 1500 lbs. per square inch gauge and higher may be employed. A particular advantage of the invention resides in the ability to employ high pressures, even in the presence of substantial amounts of liquids, over prolonged periods of time, in the absence of any substantial deterioration of catalyst structure.

In contrast to the solid type phopshoric acid catalysts generally used heretofore, the catalysts employed in the process of the invention do not undergo any substantial deterioration in the presence of liquids or substantial amounts of water vapor. It has been found that when catalyst activity has been reduced after a prolonged period of operation it is readily restored to a high activity by the direct addition of phosphoric acid in the liquid state to the catalyst bed. In a preferred method of operation the catalyst is maintained at a high level of catalyst activity by the continuous or intermittent addition of liquid phosphoric acid to the catalyst bed. The addition of the liquid phosphoric acid to the catalyst bed may be effected, for example, by spraying the liquid acid onto the catalyst bed or by injecting the acid into one or more portions of the bed. Addition of the liquid acid is controlled to avoid the seepage or a passage of liquid acid from the bed. In this wise a relatively high level of activity is maintained over prolonged periods of time in the absence of the difficulties heretofore encountered with the use of the solid-type phosphoric acid catalysts available heretofore.

The following example is illustrative of the preparation of catalysts employed in the process of the invention:

Example I

A ceramically bonded porous aggregate "P" consisting essentially of silica and alumina having a bulk density of 0.59 gm./cc., a porosity of 55 (in terms of gms. $H_2O$ absorbed per 100 gms. of aggregate) and having the following approximate composition:

| | Percent |
|---|---|
| $SiO_2$ | 86.95 |
| $Al_2O_3$ | 7.51 |
| $Fe_2O_3$ | 2.17 |
| $MgO$ | 1.22 |
| $Na_2O$ | 1.21 |
| $CaO$ | 0.65 |
| $TiO_2$ | 0.19 |
| Remainder | 0.10 | was used to prepare three catalysts designated hereinafter "A," "B," and "C," respectively.

Catalyst "A" was prepared by mixing 300 cc. of 85% $H_3PO_4$ with 250 cc. of the porous aggregate "P," refluxing the mixture for a period of 2 hours, draining excess acid from the impregnated aggregate, and heating the impregnated aggregate for 15 hours at 130° C. The catalyst "A" thus prepared was found to have a $P_2O_5$ content of 40.8%.

Catalyst "B" was prepared by dissolving 0.85 mol $P_2O_5$ in one mol of 85% $H_3PO_4$, adding 250 cc. of porous aggregate "P," allowing the mixture to stand for 2 hours, heating the impregnated aggregate at a temperature of 130° C. for 8 hours, and thereafter further calcining at a temperature of 350° C. The catalyst "B" thus prepared was found to have a $P_2O_5$ content of 50.4%.

Catalyst "C" was prepared by mixing 1200 cc. of aggregate "P" to a slurry obtained by adding 6.3 mols or $P_2O_5$ to 7.4 mols $H_3PO_4$, refluxing the mixture for a period of 3 hours during which time another 1.6 mols of $P_2O_5$ were added, heating the thus impregnated aggregate for 8 hours at 130° C., and thereafter calcining at 350° C. The catalyst "C" thus prepared had a $P_2O_5$ content of 54.8%.

The efficiency of the catalysts thus prepared when employed for the polymerization of olefinic hydrocarbons is exemplified by the following examples.

Example II

In three separate operations, propylene was polymerized with the catalyst "A" and "B" of Example I. The propylene charge to the reaction zone consisted of a caustic treated cracked propylene fraction containing 53.2% propylene. In addition to the normally gaseous hydrocarbons a recycle polymer stream having a boiling range of from 58° C. to 176° C. was charged to the reaction zone in a ratio of recycle stream to gaseous hydrocarbon charge of 1.9:1. Water was added to the charge in an amount of 0.03% by weight. The operation was carried out with a space velocity of 0.27 gal. of charge per pound of catalyst per hour. Temperatures and pressures employed in each operation and conversion of propylene to normally liquid polymer in mol per cent obtained are indicated in the following table:

| Run | Catalyst | Temp., °C. | Pressure, p. s. i. g. | Mol Per Cent Propylene Conversion |
|---|---|---|---|---|
| 1 | A | 262 | 1,500 | 73.1 |
| 2 | B | 261 | 1,500 | 90.8 |
| 3 | B | 263 | 600 | 61.0 |

*Example III*

Propylene was polymerized in the presence of catalyst "C" of Example I by bringing a charge consisting of 1 part of caustic treated cracked propylene fraction containing 54.5% by weight of propylene and 1.85 parts recycle polymer having a boiling range of from about 58 to 176° C. into contact with the catalyst under the following conditions:

Pressure: 1000 lbs. per square inch gauge
Space velocity: 0.26 gal. of charge per lb. of catalyst per hour
Water content of feed: 0.03% by weight
Temperature: 266° C.

After 6¾ hours on stream the conversion of propylene to liquid polymer was 78.7%. After 21 hours of operation a conversion of 95.5% was attained. The average conversion of propylene to liquid polymer for 95.5 hours of operation was 82%. 3.4 gals. of polymer per pound of catalyst was produced. 0.29 volume of highly desirable light polymer, consisting essentially of hydrocarbons having 12 carbon atoms to the molecule, per volume of propylene reacted were obtained.

When after a period of about 120 hours of operation conversion had fallen to 47%, 85% $H_3PO_4$ was sprayed upon the catalyst bed resulting in an increase of the conversion to 83.3% at which level it was maintained during a further 3½ hours of continuous operation.

Separate attempts to reactivate catalyst "C" after use by oxidation and by rehydration were unsuccessful as exemplified by the following example.

*Example IV*

The activity of a portion of catalyst "C" which had been used for a period of 95 hours in the polymerization of propylene under the conditions employed in the operation of Example III had fallen to the extent where a conversion of propylene to liquid polymer of only 66.2% was being obtained. Oxygen was passed over the catalyst at the rate of 100 cc. of oxygen per minute at a catalyst bed temperature of about 315° C. The result was a decrease of activity enabling the conversion of propylene to polymer of only 58.4%.

In a separate operation a portion of catalyst "C," the activity of which had been reduced by 108 hours of use in the polymerization of propylene under the conditions set forth in Example III so that a conversion of propylene to liquid polymer of only 47.4% was being obtained, was rehydrated by injecting water into the unit at the rate of 0.0092 per 100 cc. of catalyst per minute together with a slow stream of nitrogen. The catalyst was maintained at a temperature of 263° C. and the water addition was continued until a constant amount of water was obtained in the outlet nitrogen stream. No increase in activity of the catalyst as determined by propylene conversion was apparent after the rehydration of the catalyst.

The mechanical strength and improved durability of structure of the catalysts employed in the process of the invention is exemplified by the following example:

*Example V*

A catalyst "D" was prepared by impregnating aggregate "P" of Example I with 100% $H_6P_4O_{13}$ at a temperature of 210 to 240° C. for a period of 4 hours and calcining the impregnated aggregate at a temperature of 275° C. for 16 hours. The calcined catalyst was thereupon again impregnated with 100% $H_6P_4O_{13}$ at 180° C. to 210° C. for a period of 7 hours and again calcined at 300° C. for a period of 24 hours. The resulting catalysts had a phosphorus content of 21.6% and a bulk density of 1.07 gm. per cc. The crushing strength of the resulting particles on a 90° wedge was 7 kg.

In contrast thereto, a catalyst of the solid type heretofore employed, catalyst "E," consisting essentially of a calcined mixture ortho phosphoric acid and kieselguhr having a total phosphoric acid content as $P_2O_5$ of 61% had a crushing strength of the particles on a 90° wedge of 9.3 kg.

Upon testing representative samples of catalyst "D" after 107 hours of continuous use in the polymerization of propylene it was found to still have an average peripheral crushing strength of 7 kg. In contrast thereto catalyst "E" after a similar period of use under substantially identical conditions is generally found to have undergone substantial disintegration, individual remaining particles generally having crushing strength on a 90° wedge not exceeding about 0.1 kg.

The following example is illustrative of the effect of plural stage impregnation upon the effectiveness of the resulting material as an olefin polymerization catalyst:

*Example VI*

A plurality of phosphoric acid impregnated materials of varying $P_2O_5$ content were prepared as follows:

For comparative purposes a material "K" was prepared by impregnating adsorptive alumina by contact with 85% phosphoric acid ($H_3PO_4$) and calcining the impregnated alumina.

Material "L" was prepared by impregnating aggregate "P" of Example I with 85% phosphoric acid and calcining.

Material "M" was prepared by impregnating aggregate "P" of Example I in a first stage with 85% phosphoric acid and calcining, and thereafter impregnating the thus calcined impregnated material with 100% $H_6P_4O_{13}$ and further calcining the thus twice impregnated material.

Material "N" was prepared by two stage impregnation of aggregate "P" of Example I with 100% $H_6P_4O_{13}$ and calcining after each impregnation.

In a series of comparative operations 100 cc. of each of the materials thus prepared was contacted with a normally gaseous hydrocarbon charge containing about 48 mol % propylene at the following olefin polymerizing operating conditions; a hydrocarbon feed rate of 126 to 130 gms. per 100 cc. of catalyst per hour, a pressure of 450 pounds per square inch gauge, and a temperature of about 240° C.

In the following table the impregnated materials "K," "L," "M" and "N" are indicated respectively together with the type of acid and the calcining conditions employed in their production, their total $P_2O_5$ content, and the polymer produced during the propylene polymerization:

| Material impregnated | Phosphoric acid used | Calcining Temp., °C | Duration of calcination hrs. | $P_2O_5$ content of calcined material | Polymer produced gals. lb. of cat. | Duration of polymerization hrs. |
|---|---|---|---|---|---|---|
| K Alumina | 85% $H_3PO_4$ | 150 | 16 | | 0 | 4.5 |
| Do | do | 150 | 16 | | 0 | 5.5 |
| L Aggregate "P" | do | 250 | 65 | 22 | 0 | 18.1 |
| M Aggregate "P" | twice impregnated: | | | | | |
| | 85% $H_3PO_4$ | 250 | 65 | 50 | 0.16 | 9.8 |
| | 100% $H_6P_4O_{13}$ | 250 | 16 | | | |
| N Aggregate "P" | twice impregnated: | | | | | |
| | 100% $H_6P_4O_{13}$ | 275 | 17.5 | 50 | 1.87 | 107.5 |
| | 100% $H_6P_4O_{13}$ | 275 | 16 | | | |

I claim as my invention:

1. The process for the conversion of propylene to normally liquid hydrocarbons which comprises contacting hydrocarbons comprising propylene in the vapor phase at olefin polymerizing conditions with a solid phosphoric acid catalyst consisting essentially of a calcined, phosphoric acid impregnated, ceramically bonded, porous aggregate having a phosphorus pentoxide content of from about 35% to about 70%, and maintaining the activity of said catalyst at a relatively high level by the direct addition of liquid phosphoric acid thereto.

2. The process for the conversion of propylene to normally liquid hydrocarbons in accordance with claim 1 wherein said ceramically bonded, porous aggregate consists essentially of ceramically bonded silica.

3. The process for the conversion of propylene to normally liquid hydrocarbons in accordance with claim 1 wherein said ceramically bonded, porous aggregate consists essentially of a ceramically bonded mixture of silica and alumina.

4. The process for the conversion of propylene to normally liquid hydrocarbons in accordance with claim 1 wherein said ceramically bonded, porous aggregate consists essentially of a ceramically bonded mixture of silica and alumina containing from about 70% to about 95% silica, and from about 5% to about 30% alumina.

5. The process for the conversion of normally gaseous olefinic hydrocarbons to normally liquid hydrocarbons which comprises contacting said hydrocarbons in the vapor phase at olefin polymerizing conditions with a solid phosphoric acid catalyst consisting essentially of a calcined, phosphoric acid impregnated, ceramically bonded, porous aggregate having a phosphorus pentoxide content of from about 35% to about 70%, and maintaining the activity of said catalyst at a relatively high level by the direct addition of liquid phosphoric acid thereto.

6. The process in accordance with claim 5 wherein said porous ceramically bonded porous aggregate consists essentially of a ceramically bonded mixture of silica and alumina.

7. The process in accordance with claim 5 wherein said ceramically bonded, porous aggregate consists essentially of ceramically bonded silica.

8. The process for the conversion of normally gaseous olefinic hydrocarbons to normally liquid hydrocarbons which comprises contacting said hydrocarbons in the vapor phase at olefin polymerizing conditions with a solid phosphoric acid catalyst consisting essentially of a calcined, phosphoric acid impregnated, ceramically bonded, porous mixture of silica and alumina, and maintaining the activity of said catalyst at a relatively high level by the direct addition of liquid phosphoric acid thereto.

9. The process for the conversion of normally gaseous olefinic hydrocarbons to normally liquid hydrocarbons in accordance with claim 8 wherein said ceramically bonded, porous aggregate consists essentially of ceramically bonded silicon carbide.

10. The process for the conversion of normally gaseous olefinic hydrocarbons to normally liquid hydrocarbons which comprises contacting said hydrocarbons in the vapor phase at olefin polymerizing conditions with a solid phosphoric acid catalyst consisting essentially of a calcined, phosphoric acid impregnated, ceramically bonded silica until said catalyst has become at least partially spent with respect to its ability to promote the olefin polymerization reaction, and thereupon restoring the activity of said catalyst in situ by the direct addition of phosphoric acid in the liquid state to said catalyst.

11. The process for the polymerization of olefinic hydrocarbons which comprises contacting olefinic hydrocarbons in the vapor phase at olefin polymerizing conditions with a solid phosphoric acid catalyst consisting essentially of a calcined, phosphoric acid impregnated, ceramically bonded, porous aggregate until said catalyst has become at least partially spent with respect to its ability to promote the olefin polymerization reaction, and thereupon restoring the activity of said catalyst in situ by the direct addition of phosphoric acid in the liquid state to said catalyst.

WILLIAM KEDDIE MEERBOTT.

REFERENCES CITED

The following references are of record in the file of this patent:

UNITED STATES PATENTS

| Number | Name | Date |
|---|---|---|
| 2,116,151 | Ipatieff et al. | May 3, 1938 |
| 2,120,702 | Ipatieff et al. | June 14, 1938 |
| 2,120,723 | Watson | June 14, 1938 |
| 2,387,318 | Drennan | Oct. 23, 1945 |
| 2,392,896 | Allender | Jan. 15, 1946 |
| 2,424,085 | Bergsteinsson et al. | July 15, 1947 |
| 2,446,619 | Stewart et al. | Aug. 10, 1948 |

FOREIGN PATENTS

| Number | Country | Date |
|---|---|---|
| 312,733 | Great Britain | Jan. 18, 1929 |